(12) United States Patent
Yang et al.

(10) Patent No.: US 7,484,483 B2
(45) Date of Patent: Feb. 3, 2009

(54) SYSTEM AND METHOD FOR VARIABLE VALVE ACTUATION IN AN INTERNAL COMBUSTION ENGINE

(75) Inventors: Zhou Yang, South Windsor, CT (US); Bruce A. Swanbon, Tolland, CT (US); Richard E. Vanderpoel, Bloomfield, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 11/189,814

(22) Filed: Jul. 27, 2005

(65) Prior Publication Data

US 2006/0081213 A1 Apr. 20, 2006

Related U.S. Application Data

(60) Provisional application No. 60/618,178, filed on Oct. 14, 2004.

(51) Int. Cl.
*F01L 1/34* (2006.01)
(52) U.S. Cl. ............... 123/90.15; 123/90.16; 123/90.12
(58) Field of Classification Search ............. 123/90.12, 123/90.15, 90.16
See application file for complete search history.

(56) References Cited

U.S. PATENT DOCUMENTS

| 5,829,397 A | * | 11/1998 | Vorih et al. ............... 123/90.12 |
| 6,192,841 B1 | | 2/2001 | Vorih et al. |
| 6,374,784 B1 | | 4/2002 | Tisher et al. |
| 2003/0106532 A1 | * | 6/2003 | Tian et al. .................... 123/446 |
| 2004/0103868 A1 | * | 6/2004 | Engelberg ................ 123/90.12 |

* cited by examiner

*Primary Examiner*—Zelalem Eshete
(74) *Attorney, Agent, or Firm*—David R. Yohannan, Esq.; Kelley Drye & Warren LLP

(57) ABSTRACT

A system and method for actuating one or more engine valves is provided. In particular, systems and methods for providing variable valve actuation to improve engine performance are provided. Embodiments of the present invention may be used in conjunction with positive power, engine braking, and/or exhaust gas recirculation operation of an internal combustion engine. In one embodiment, the system comprises: a valve train element; a housing disposed intermediate the valve train element and the engine valve; an outer piston slidably disposed in a bore formed in the housing, the outer piston having a cavity formed therein; an inner piston slidably disposed in the outer piston cavity; and a valve in communication with the outer piston cavity, the valve having more than one position, wherein the position of the valve determines the timing of the engine valve event.

12 Claims, 12 Drawing Sheets

SYSTEM AND METHOD FOR VARIABLE VALVE ACTUATION IN AN INTERNAL COMBUSTION ENGINE

CROSS-REFERENCE TO RELATED APPLICATION

This application relates to and claims priority on U.S. Provisional Application No. 60/618,178, filed Oct. 14, 2004 and entitled "System and Method for Variable Valve Actuation in an Internal Combustion Engine," a copy of which is incorporated herein by reference in its entirety.

FIELD OF THE INVENTION

The present invention relates generally to a system and method for actuating one or more valves in an engine. In particular, the present invention relates to systems and methods for providing variable valve actuation to improve engine performance. Embodiments of the present invention may be used in conjunction with positive power, engine braking, and/or exhaust gas recirculation operation of an internal combustion engine.

BACKGROUND OF THE INVENTION

Valve actuation in an internal combustion engine is required in order for the engine to produce positive power, engine braking, and exhaust gas recirculation (EGR). During positive power, one or more intake valves may be opened to admit fuel and air into a cylinder for combustion. One or more exhaust valves may be opened to allow combustion gas to escape from the cylinder. Intake, exhaust, and/or auxiliary valves may also be opened during positive power at various times to recirculate gases for improved emissions.

Engine valve actuation also may be used to produce engine braking and exhaust gas recirculation when the engine is not being used to produce positive power. During engine braking, one or more exhaust valves may be selectively opened to convert, at least temporarily, the engine into an air compressor. In doing so, the engine develops retarding horsepower to help slow the vehicle down. This can provide the operator with increased control over the vehicle and substantially reduce wear on the service brakes of the vehicle.

Engine valve(s) may be actuated to produce compression-release braking and/or bleeder braking. The operation of a compression-release type engine brake, or retarder, is well known. As a piston travels upward during its compression stroke, the gases that are trapped in the cylinder are compressed. The compressed gases oppose the upward motion of the piston. During engine braking operation, as the piston approaches the top dead center (TDC), at least one exhaust valve is opened to release the compressed gases in the cylinder to the exhaust manifold, preventing the energy stored in the compressed gases from being returned to the engine on the subsequent expansion down-stroke. In doing so, the engine develops retarding power to help slow the vehicle down. An example of a prior art compression release engine brake is provided by the disclosure of Cummins, U.S. Pat. No. 3,220,392 (November 1965), which is incorporated herein by reference.

The operation of a bleeder type engine brake has also long been known. During engine braking, in addition to the normal exhaust valve lift, the exhaust valve(s) may be held slightly open continuously throughout the remaining engine cycle (full-cycle bleeder brake) or during a portion of the cycle (partial-cycle bleeder brake). The primary difference between a partial-cycle bleeder brake and a full-cycle bleeder brake is that the former does not have exhaust valve lift during most of the intake stroke.

The basic principles of exhaust gas recirculation (EGR) are also well known. After a properly operating engine has performed work on the combination of fuel and inlet air in its combustion chamber, the engine exhausts the remaining gas from the engine cylinder. An EGR system allows a portion of these exhaust gases to flow back into the engine cylinder. This recirculation of gases into the engine cylinder may be used during positive power operation, and/or during engine braking cycles to provide significant benefits. As used herein, EGR may include brake gas recirculation (BGR), which is the recirculation of gases during engine braking cycles.

During positive power operation, an EGR system is primarily used to improve engine emissions. During engine positive power, one or more intake valves may be opened to admit fuel and air from the atmosphere, which contains the oxygen required to burn the fuel in the cylinder. The air, however, also contains a large quantity of nitrogen. The high temperature found within the engine cylinder causes the nitrogen to react with any unused oxygen and form nitrogen oxides (NOx). Nitrogen oxides are one of the main pollutants emitted by diesel engines. The recirculated gases provided by an EGR system have already been used by the engine and contain only a small amount of oxygen. By mixing these gases with fresh air, the amount of oxygen entering the engine may be reduced and fewer nitrogen oxides may be formed. In addition, the recirculated gases may have the effect of lowering the combustion temperature in the engine cylinder below the point at which nitrogen combines with oxygen to form NOx. As a result, EGR systems may work to reduce the amount of NOx produced and to improve engine emissions. Current environmental standards for diesel engines, as well as proposed regulations, in the United States and other countries indicate that the need for improved emissions will only become more important in the future.

An EGR system may also be used to optimize retarding power during engine braking operation. As discussed above, during engine braking, one or more exhaust valves may be selectively opened to convert, at least temporarily, the engine into an air compressor. By controlling the pressure and temperature in the engine using EGR, the level of braking may be optimized at various operating conditions.

In many internal combustion engines, the engine intake and exhaust valves may be opened and closed by fixed profile cams, and more specifically by one or more fixed lobes which may be an integral part of each of the cams. Benefits such as increased performance, improved fuel economy, lower emissions, and better vehicle drivability may be obtained if the intake and exhaust valve timing and lift can be varied. The use of fixed profile cams, however, can make it difficult to adjust the timings and/or amounts of engine valve lift to optimize them for various engine operating conditions.

One method of adjusting valve timing and lift, given a fixed cam profile, has been to provide valve actuation that incorporates a "lost motion" system in the valve train linkage between the valve and the cam. Lost motion is the term applied to a class of technical solutions for modifying the valve motion proscribed by a cam profile with a variable length mechanical, hydraulic, and/or other linkage assembly. In a lost motion system, a cam lobe may provide the "maximum" (longest dwell and greatest lift) motion needed over a full range of engine operating conditions. A variable length system may then be included in the valve train linkage, intermediate of the valve to be opened and the cam providing the maximum motion, to subtract or lose part or all of the motion imparted by the cam to the valve.

Some previous lost motion systems have utilized high speed mechanisms to rapidly vary the length of the lost motion system. By using a high speed mechanism to vary the length of the lost motion system, precise control may be attained over valve actuation, and accordingly optimal valve actuation may be attained for a wide range of engine operating conditions. Systems utilizing high speed control mechanisms, however, can be costly to manufacture and operate.

The systems and methods of the present invention may be particularly useful in engines requiring valve actuation for positive power, engine braking valve events and/or EGR/BGR valve events. The systems and methods of various embodiments of the present invention may provide a lower cost, production viable variable valve actuation system that requires no high speed electronic controls to operate. In addition, the systems and methods of the present invention may provide variable valve opening and closing to improve engine performance during positive power, engine braking, and/or EGR/BGR operation of an internal combustion engine.

Additional advantages of embodiments of the invention are set forth, in part, in the description which follows and, in part, will be apparent to one of ordinary skill in the art from the description and/or from the practice of the invention.

SUMMARY OF THE INVENTION

Responsive to the foregoing challenges, Applicant has developed innovative systems and methods for actuating one or more engine valves. In one embodiment, the present invention is a valve actuation system for providing variable valve opening and/or closing comprising a means for imparting motion operatively connected to a valve actuator, which in turn is operatively connected to one or more engine valves.

Applicant has developed a system for actuating an engine valve in an internal combustion engine to produce an engine valve event. In one embodiment, the system comprises: means for imparting valve actuation motion; a housing disposed intermediate the motion imparting means and the engine valve; an outer piston slidably disposed in a bore formed in the housing, the outer piston having a cavity formed therein; an inner piston slidably disposed in the outer piston cavity; and a valve in communication with the outer piston cavity, the valve having more than one position, wherein the position of the valve determines the timing of the engine valve event.

Applicant has further developed a system for actuating an engine valve in an internal combustion engine to produce an engine valve event. In one embodiment, the system comprises: means for imparting valve actuation motion; a housing disposed intermediate the motion imparting means and the engine valve; an outer piston slidably disposed in a bore formed in the housing, the outer piston having a cavity formed therein; an inner piston slidably disposed in the outer piston cavity; a valve in communication with the outer piston cavity, the valve having a first position and a second position, wherein the position of the valve determines the timing of the engine valve event; a supply passage adapted to supply hydraulic fluid to the outer piston cavity; and a reset passage adapted to release hydraulic fluid from the outer piston cavity.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

DETAILED DESCRIPTION OF PREFERRED EMBODIMENTS OF THE INVENTION

Reference will now be made in detail to embodiments of the system and method of the present invention, examples of which are illustrated in the accompanying drawings. As embodied herein, the present invention includes systems and methods for controlling the actuation of engine valves.

Figure 1:
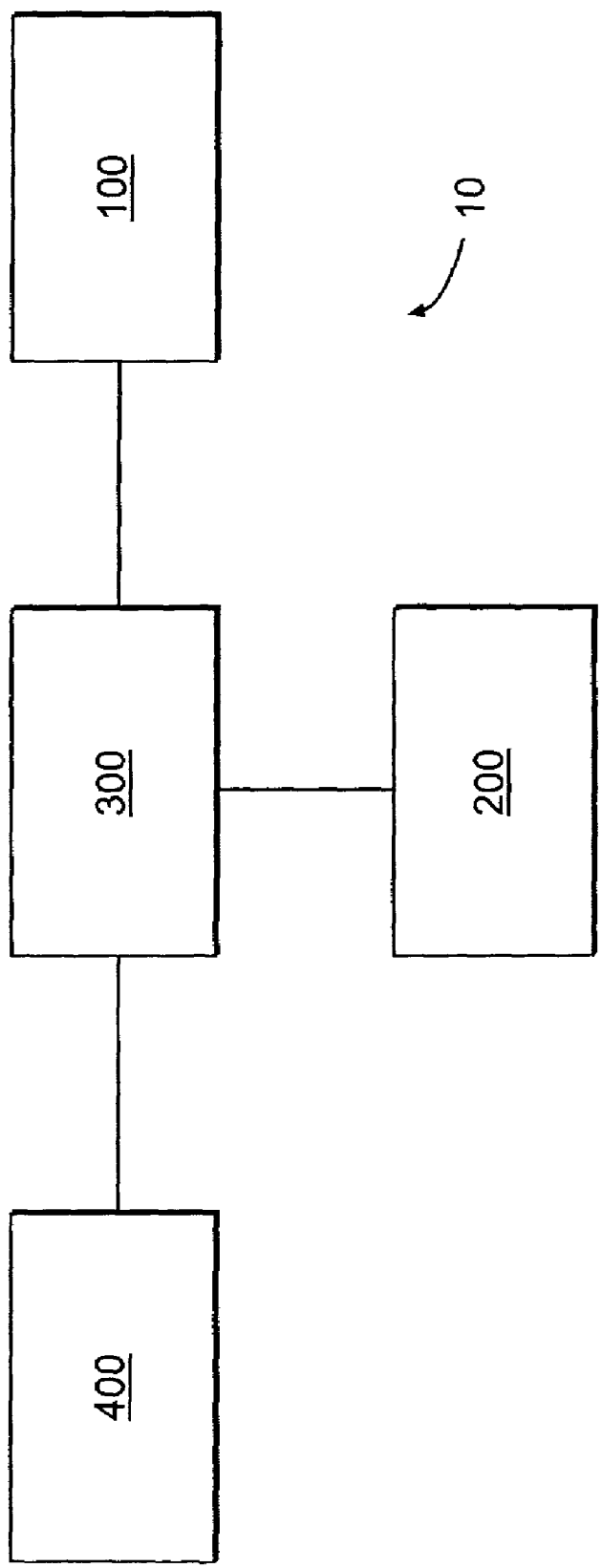
FIG. 1 is a schematic representation of a valve actuation system according to a first embodiment of the present invention.

A first embodiment of the present invention is shown schematically in FIG. 1 as valve actuation system 10. The valve actuation system 10 includes a means for imparting motion 100 operatively connected to a valve actuator 300, which in turn is operatively connected to one or more engine valves 200. The motion imparting means 100 is adapted to apply motion to the valve actuator 300. The valve actuator 300 may be selectively controlled to (1) transfer all or (2) transfer less than all motion to the valves 200. The valve actuator 300 may also be adapted to selectively modify the amount and timing of the motion transferred to the engine valves 200.

When operating in the motion transfer mode, the valve actuator 300 may actuate the engine valves 200 to produce one or more engine valve events, such as, but not limited to, main intake, main exhaust, compression release braking, bleeder braking, and/or exhaust gas recirculation events. The valve actuation system 10, including the valve actuator 300, may be switched between the modes of transferring all motion and not transferring all motion in response to a signal or input from a controller 400. The engine valves 200 may be one or more exhaust valves, intake valves, or auxiliary valves.

The motion imparting means 100 may comprise any combination of electrical, hydraulic, and mechanical elements, such as cam(s), push tube(s), and rocker arm(s) for example, or their equivalents, which are adapted to impart motion to the valve actuator 300 on a periodic basis. In at least one embodiment of the present invention, the motion imparting means 100 comprises a cam 110. The cam 110 may comprise an exhaust cam, an intake cam, an injector cam, and/or a dedicated cam. The cam 110 may include one or more cam lobes for producing one or more engine valve event(s). The cam 110 may include lobes, such as, for example, a main (exhaust or intake) event lobe, an engine braking event lobe, and an EGR/BGR event lobe. The cam 110 may be adapted to provide conventional engine valve opening and closing times, or may be adapted to provide modified (earlier or later) engine valve opening and closing times.

The valve actuator 300 may comprise any structure that selectively transmits motion to actuate the valves 200. The valve actuator 300 may comprise, for example, a mechanical linkage, a hydraulic linkage, a hydro-mechanical linkage, an electromechanical linkage, an electromagnetic linkage, an air linkage, and/or any other linkage adapted to selectively transmit motion.

With continued reference to FIG. 1, when it incorporates a hydraulic circuit, the valve actuator 300 may be operatively connected to means for supplying hydraulic fluid to and from the valve actuator 300. The supply means may include means for adjusting the pressure of, or the amount of, fluid in the circuit, such as, for example, trigger valve(s), control valve(s), accumulator(s), check valve(s), fluid supply source(s), and/or other devices used to release hydraulic fluid from a circuit, add hydraulic fluid to a circuit, or control the flow of fluid in a circuit. The valve actuator 300 may be located at any point in the valve train connecting the motion imparting means 100 and the valves 200.

The controller 400 may comprise any electronic, mechanical, hydraulic, electro-hydraulic, or other type of control device for communicating with the valve actuator 300 and causing it to either transfer the motion, or not transfer some or all of the motion, to the engine valves 200. The controller 400 may include a microprocessor, linked to other engine component(s), to determine and select the appropriate operation of the valve actuator 300. Positive power, engine braking, and/or EGR/BGR operation may be achieved and optimized at a plurality of engine operating conditions (e.g., speeds, loads, etc.) by controlling the valve actuator 300 based upon information collected by the microprocessor from the engine component(s). The information collected may include, without limitation, engine speed, vehicle speed, oil temperature, manifold (or port) temperature, manifold (or port) pressure, cylinder temperature, cylinder pressure, particulate information, and/or crank angle.

Embodiments of the valve actuation system 10 of the present invention may provide variable valve opening and/or closing of one or more engine valves 200. By varying the valve timing, engine performance during positive power, engine braking, and/or EGR/BGR operation may be improved.

Figure 2:
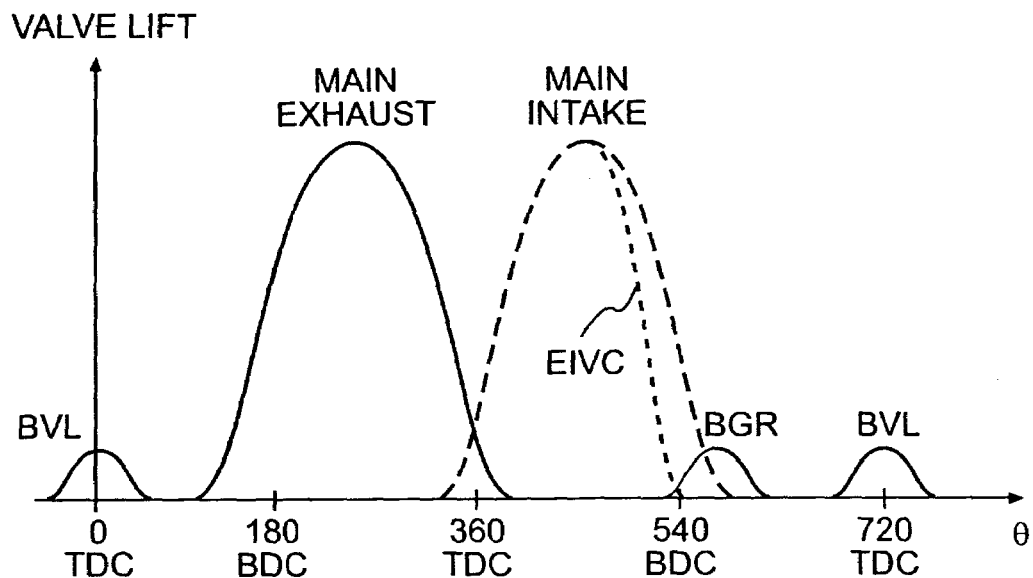
FIG. 2 is a valve lift diagram of exhaust valve and intake valve events, including earlier intake valve closing (EIVC), according to an embodiment of the present invention.

FIG. 2 illustrates the valve lift versus crank angle for exhaust valve and intake valve events in an embodiment of the present invention having earlier intake valve closing (EIVC). EIVC may be achieved using one or more embodiments of the valve actuation system 10 of the present invention. As shown in FIG. 2, the exhaust valve may undergo a main exhaust valve event, a brake gas recirculation (BGR) valve event, and a braking event valve lift (BVL), such as a compression release braking event. The engine intake valve may undergo a main intake event.

Figure 3:
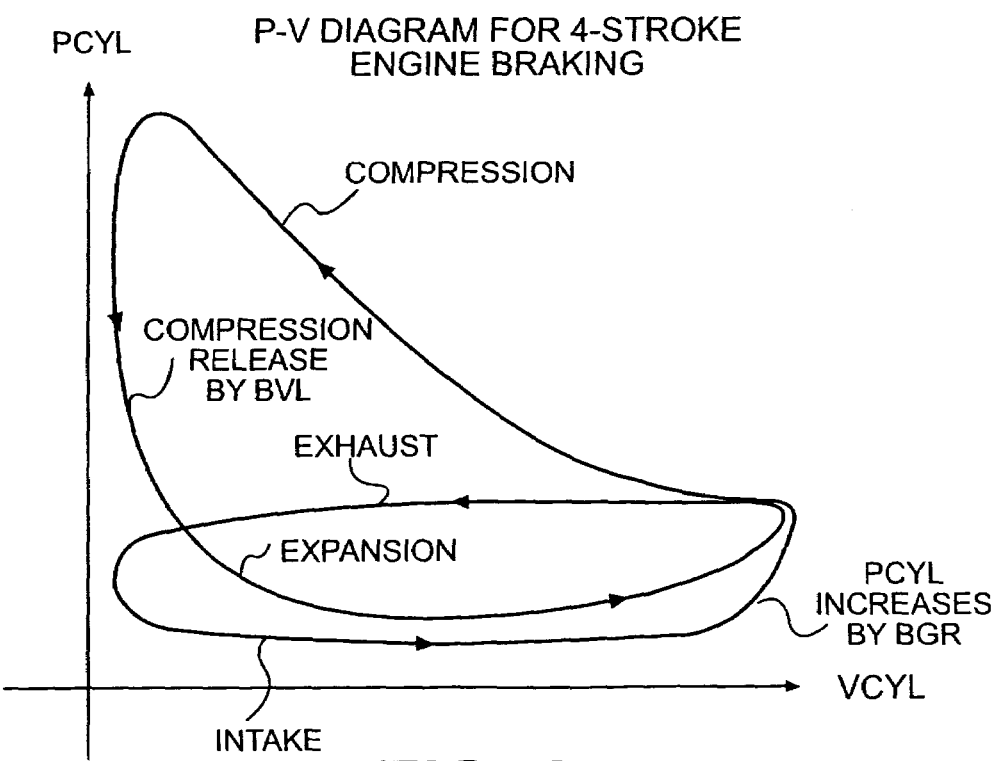
FIG. 3 is a P-V diagram for an engine having four stroke engine braking according to an embodiment of the present invention.

Conventional main intake event timing may result in an overlap between the main intake valve event and the BGR event near bottom dead center (BDC). Because the exhaust manifold pressure may be highest at this point, exhaust gas may flow from the exhaust manifold to the intake manifold through simultaneously open exhaust and intake valves. This exhaust back flow may reduce the amount of cooled mass flow through the engine, leading to reduced performance during engine braking operation. As shown in FIG. 2, the intake valve may be closed at a point earlier than the conventional main intake event timing to reduce the overlap, and, thus reduce the amount of exhaust back flow. This modified timing may result in improved performance during engine braking operation. FIG. 3 illustrates a P-V diagram for an engine having earlier intake valve closing according to an embodiment of the present invention.

Figure 4:
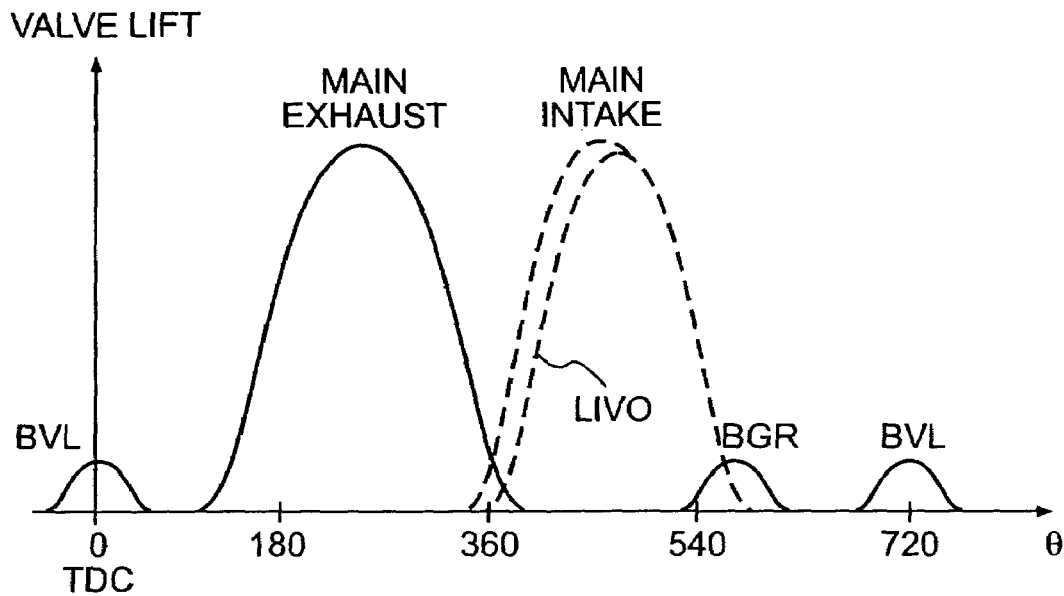
FIG. 4 is a valve lift diagram of exhaust valve and intake valve events, including later intake valve opening (LIVO) according to an embodiment of the present invention.

FIG. 4 illustrates the valve lift versus crank angle for exhaust valve and intake valve events in an embodiment of the present invention having later intake valve opening (LIVO). LIVO may be achieved using one or more embodiments of the valve actuation system 10 of the present invention. Conventional main intake event timing may result in an overlap between the main exhaust event and the intake valve event near TDC, which allows exhaust back flow from the exhaust manifold to the intake manifold through simultaneously open exhaust and intake valves. As shown in FIG. 4, the intake valve may be opened at a point later than the conventional main intake event timing to reduce this overlap. This modified timing may result in improved performance during engine braking and positive power operation.

Figure 5:
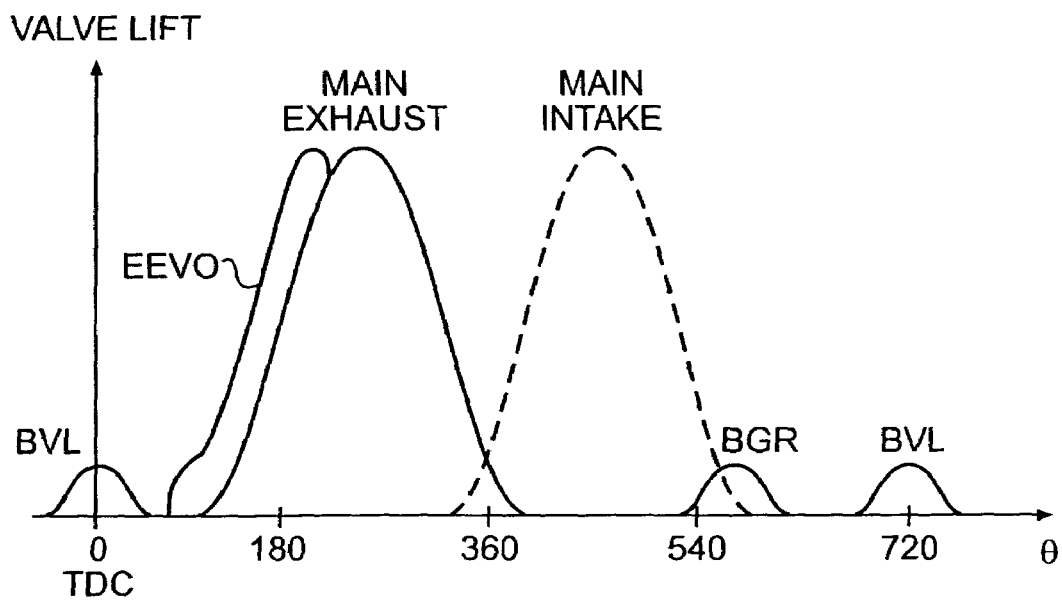
FIG. 5 is a valve lift diagram of exhaust valve and intake valve events, including earlier exhaust valve opening (EEVO) according to an embodiment of the present invention.

FIG. 5 illustrates the valve lift versus crank angle for exhaust valve and intake valve events in an embodiment of the present invention having earlier exhaust valve opening (EEVO). EEVO may be achieved using one or more embodiments of the valve actuation system 10 of the present invention. In order to improve turbocharger response or exhaust thermal condition, it may be desirable to open the exhaust valve earlier than conventional timing.

Figure 6:
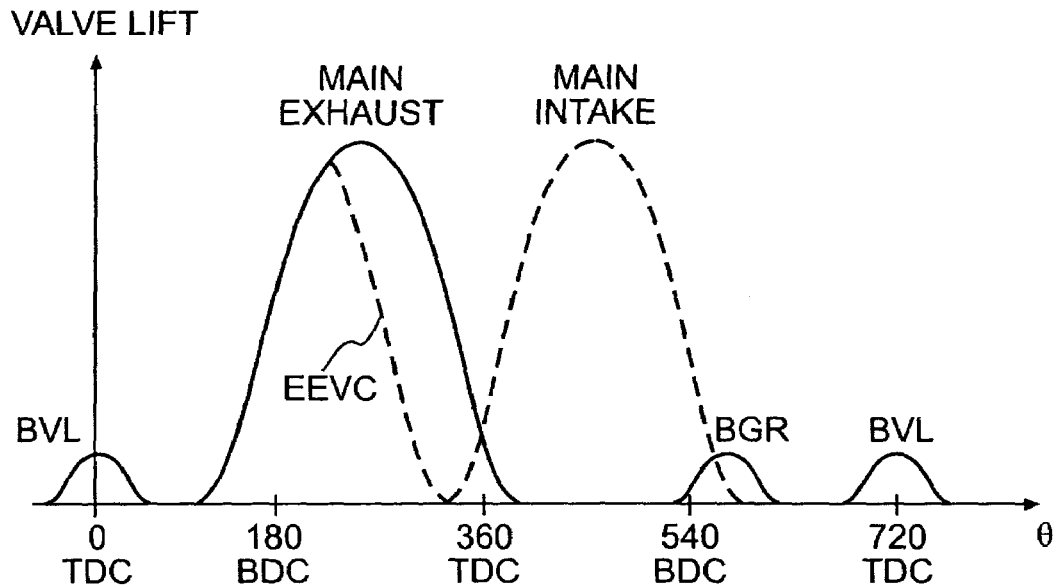
FIG. 6 is a valve lift diagram of exhaust valve and intake valve events, including earlier exhaust valve closing (EEVC) according to an embodiment of the present invention.

FIG. 6 illustrates the valve lift versus crank angle for exhaust valve and intake valve events in an embodiment of the present invention having earlier exhaust valve closing (EEVC). EEVC may be achieved using one or more embodiments of the valve actuation system 10 of the present invention. Conventional main exhaust event timing may result in an overlap between the main exhaust event and the intake valve event near TDC, which allows exhaust back flow from the exhaust manifold to the intake manifold through simultaneously open exhaust and intake valves. As shown in FIG. 6, the exhaust valve may be closed at a point earlier than the conventional main exhaust event timing to reduce this overlap. This modified timing may result in improved performance during engine braking and positive power operation.

Figure 7:
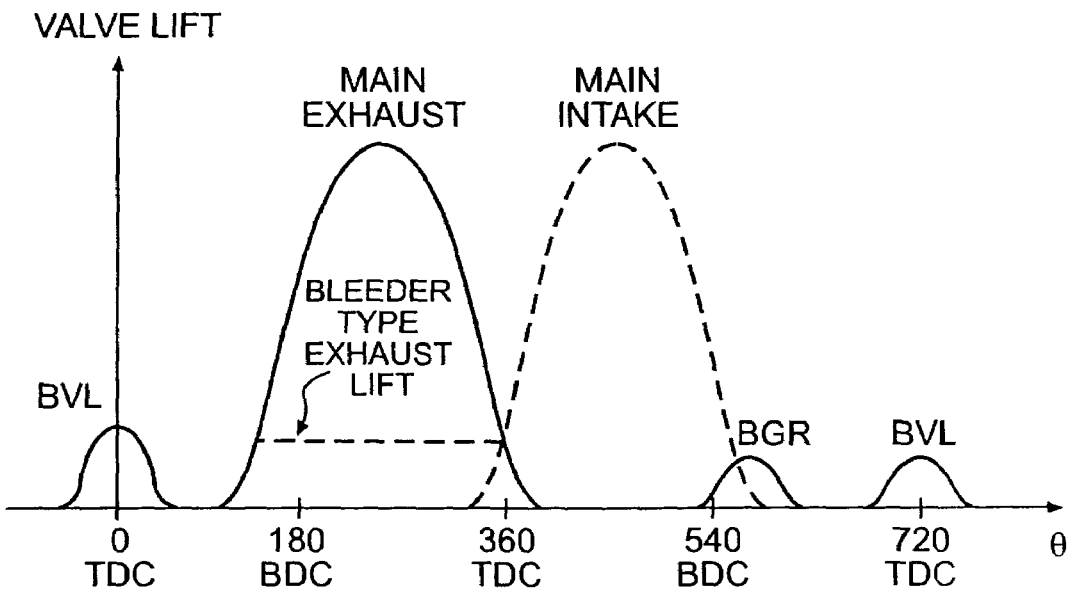
FIG. 7 is a valve lift diagram of exhaust valve and intake valve events, including a stroke-limited exhaust valve lift according to an embodiment of the present invention.

FIG. 7 illustrates the valve lift versus crank angle for exhaust valve and intake valve events in an embodiment of the present invention having stroke-limited exhaust valve lift. Stroke-limited exhaust valve lift may be achieved using one or more embodiments of the valve actuation system 10 of the present invention. The stroke-limited exhaust valve lift may be use to provide a bleeder-type braking lift and to generate a second stroke braking event.

Figure 8:
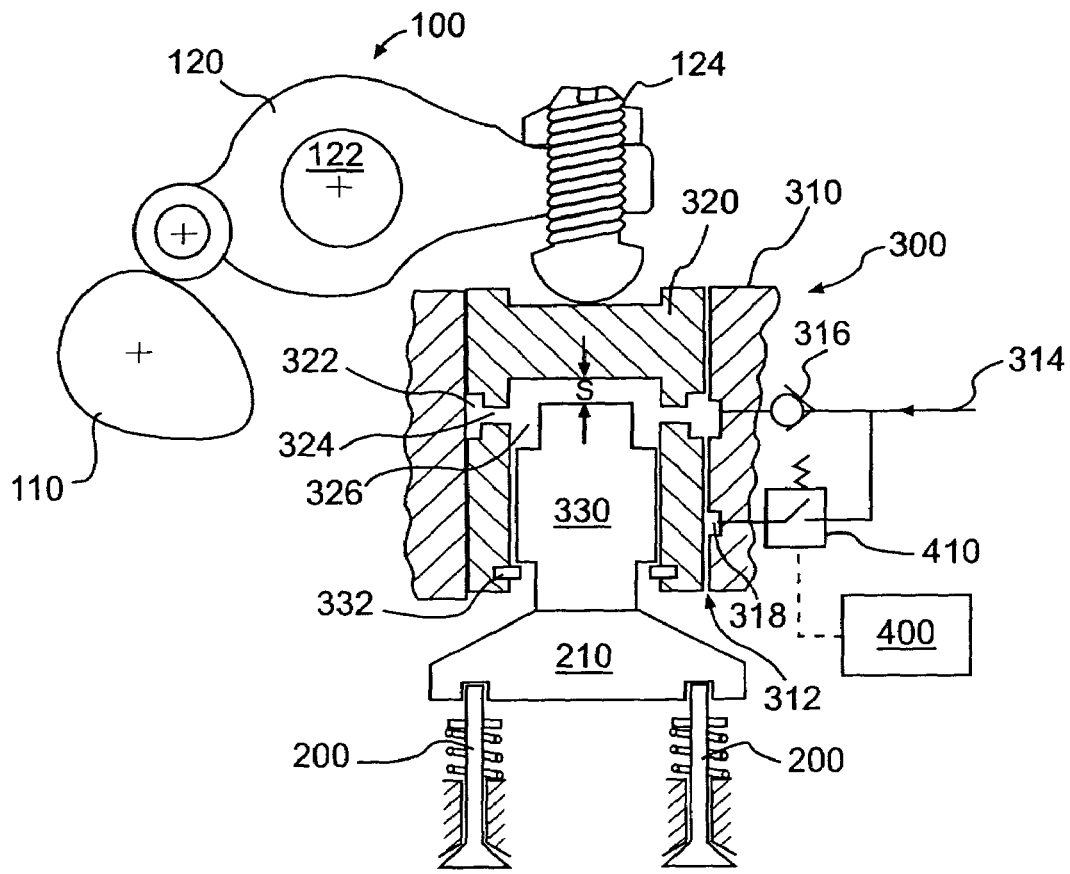
FIG. 8 is a schematic diagram of a valve actuation system according to a second embodiment of the present invention.

An embodiment of the valve actuation system 10 is shown in FIG. 8. Like earlier embodiments, the valve actuation system 10 may include one or more engine valves 200, a variable valve actuation system 300, a means for imparting motion to the variable valve actuation system 100, and a controller 400.

The means for imparting motion 100 may include a cam 110 operatively connected to a rocker arm 120. A roller may act as the contact point between the rocker arm 120 and the cam 110 to facilitate low friction interaction between these elements. The rocker arm 120 may be disposed on a rocker shaft 122 so that the rocker arm 120 is able to rock reciprocally about the rocker shaft. One end of the rocker arm 120 may include a lash adjuster 124. Various types of lash adjusters 124 may be used without departing from the intended scope of the invention. The lash adjuster 124 shown in FIG. 8 may be manually adjusted by turning the central screw to reduce or increase the space between the lash adjuster elephant foot and the variable valve actuator 300, as desired.

The one or more engine valves 200 may be intake, exhaust, or auxiliary valves that provide selective communication between an engine cylinder and the intake or exhaust manifolds of an engine. In the embodiment shown in FIG. 8, a valve bridge 210 is provided between the variable valve actuator 300 and the engine valves 200. The valve bridge 210 may enable a single variable valve actuator 300 to act on two or more valves. It is appreciated that the valve actuation system 10 may not include a valve bridge 210 in alternative embodiments of the present invention.

The variable valve actuator 300 may be provided in a fixed housing 310 disposed intermediate of the means for imparting motion 100 and the engine valves 200. The housing 310 may include an outer piston bore 312 extending therethrough. A low pressure hydraulic fluid supply passage 314 may extend through the housing 310 and terminate at the outer piston bore 312. A check valve 316 may be disposed in the supply passage 314 so as to primarily allow only one-way fluid flow from the fluid supply passage 314 to the outer piston bore 312.

A reset passage 318 may also be provided in the housing 310. The reset passage 318 may terminate at the outer piston bore 312 at a position located closer to the engine valves 200 than the position at which the supply passage 314 meets the outer piston bore 310. The reset passage 318 may connect to the supply passage 314 or the low pressure supply (not shown) at some point. A switch valve 410 may be connected to the reset passage 318 so as to control the flow of fluid through the reset passage. The switch valve 410 is shown in an open position in FIG. 8. In the open position, fluid flow is blocked from the outer piston bore 312 through the reset passage 318 and back to the fluid supply. When the switch valve 410 is closed, fluid may flow through the reset passage 318 back to the supply passage 314. The controller 400 may direct the switch valve 410 to open and close as needed.

An outer piston 320 may be slidably disposed in the outer piston bore 312. The outer piston 320 may include an upper surface adapted to receive an input motion from the means for imparting motion 100. An annular detent 322 may be provided in the outer wall of the outer piston 320. The annular detent 322 may be located on the outer piston 320 so that it registers with the fluid supply passage 314 when the engine valves 200 are in a closed position. The outer piston 320 may also include an interior cavity 326. One or more outer piston passages 324 may extend between the annular detent 322 and the interior cavity 326.

An inner piston 330 may be slidably disposed in the cavity 326 in the outer piston 320. A retaining ring 332 may limit the downward extension of the inner piston 330 relative to the outer piston 320. The inner piston 330 may be shaped at its upper end in a manner that permits hydraulic fluid to flow into the cavity 326 and push the inner piston downward into contact with the valve bridge 210 (or directly into a valve 200 in alternative embodiments).

Figure 9:
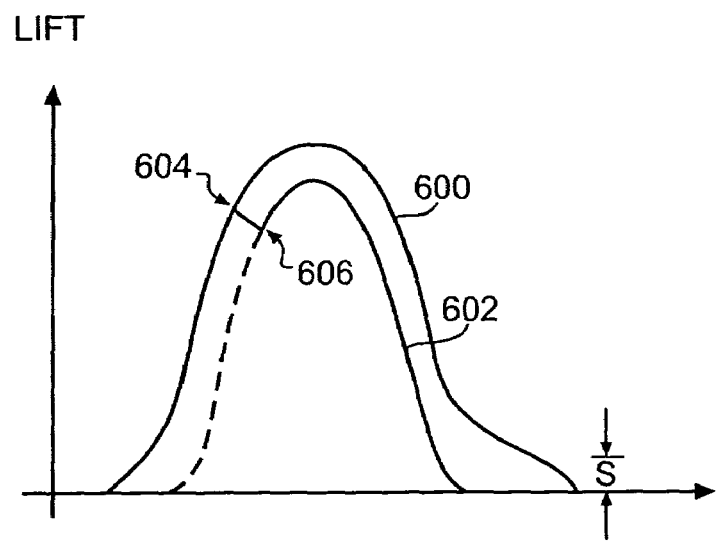
FIG. 9 is a valve lift diagram according to the valve actuation system depicted in FIG. 8.

The embodiment of the present invention shown in FIG. 8 may be operated as follows to provide selective early intake or exhaust valve closing as illustrated in FIG. 9. During engine operation, hydraulic fluid may be supplied to supply passage 314. Fluid flows past the one-way check valve 316 to the terminus of the supply passage 314 at the outer piston bore 312. When the rocker arm 120 is in contact with the cam 110 base circle, the outer piston 320 attains its upper most position in the outer piston bore 312. At this point, the annular detent 322 in the outer piston registers with the terminus of the supply passage 314 and fluid may enter the cavity 326 in the outer piston through the outer piston passages 324. As low pressure fluid enters the cavity 326, the inner piston 330 moves downward relative to the outer piston 320 so that space s is created between the outer piston and the inner piston. The inner piston 330 may move downward until it is prevented from further downward movement by either the retaining ring 332, or the opposing force from springs that bias the valves 200 closed.

As the rocker arm 120 is rotated downward on the outer piston 320 by the one or more lobes on the cam 110, the outer piston slides downward in the outer piston bore 312. The fluid in the cavity 326 cannot escape at this point, however, because the check valve 316 does not permit fluid to flow back towards the low pressure supply. As a result, the inner piston 330 is hydraulically locked relative to the outer piston 320 and the inner piston slides downward with the outer piston and acts on the valve bridge 210 and valves 200.

When the outer piston 320 moves downward sufficiently for the annular detent 322 to register with the reset passage 318, one of two things may occur. If the switch valve 410 is in an open position, as shown in FIG. 8, fluid cannot flow out of the cavity 326 and the inner piston 330 continues to move downward in unison with the outer piston 320. This valve motion provided when the switch valve 410 is open is illustrated by curve 600 in FIG. 9. If the switch valve 410 is closed, however, the high pressure fluid in the cavity 326 can vent through the reset passage 318 to the low pressure supply, where it is absorbed. When venting through the reset passage occurs, the inner piston 330 may collapse into the outer piston cavity 326, thereby taking up space s. With reference to FIG. 9, the valve motion provided when the switch valve 410 is closed is illustrated by curve 602, where venting begins at point 604 and is completed at point 606. As is evident from FIG. 9, by selectively opening or closing the switch valve 410, the engine valves 200 may experience later valve closing (curve 600) or earlier valve closing (curve 602).

Figure 10:
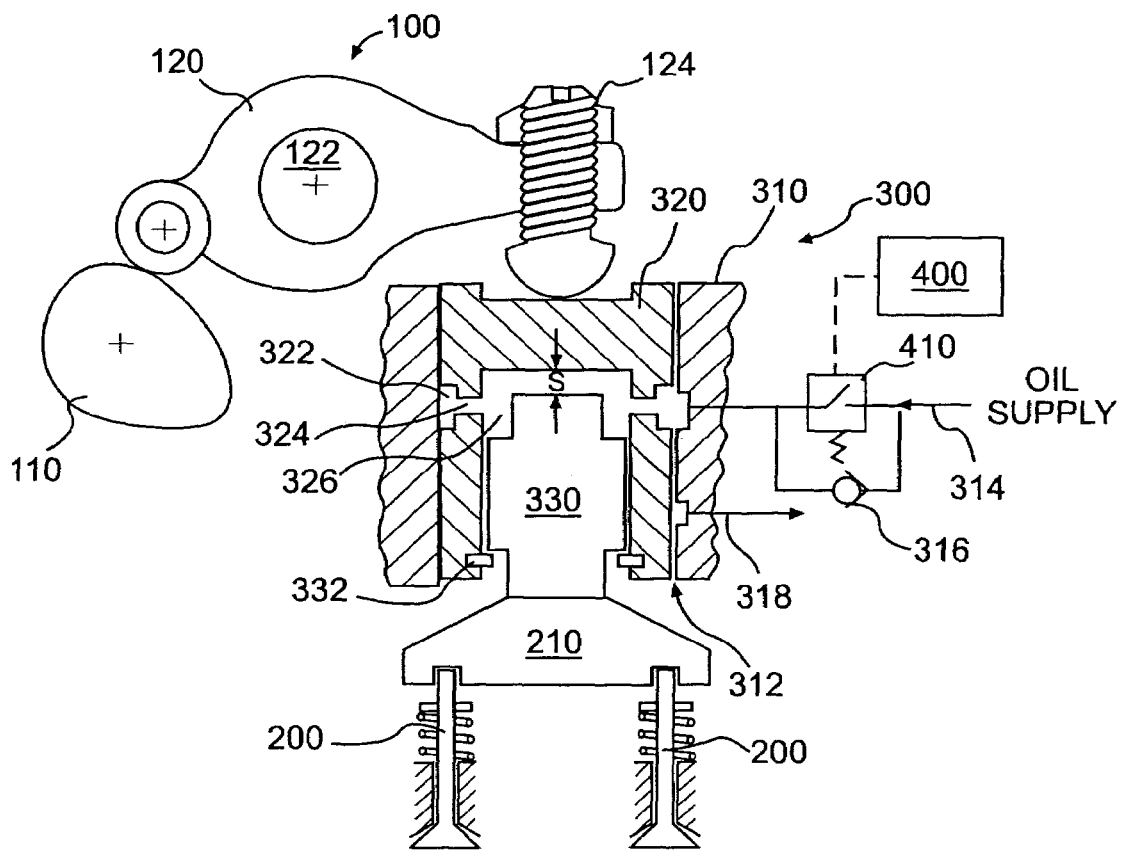
FIG. 10 is a schematic diagram of a valve actuation system according to a third embodiment of the present invention.

With reference to FIG. 10, in which like reference characters refer to like elements, the variable valve actuator 300 is slightly different from the system shown in FIG. 8 to provide selective later or earlier valve opening. The switch valve 410 is connected to the supply passage 314 instead of being connected to the reset passage 318. As a result the variable valve actuator 300 operates as follows.

During engine operation, hydraulic fluid may be supplied to supply passage 314, and may flow through the check valve 316 to the cavity 326 between the inner piston 330 and the outer piston 320. When the switch valve 410 is closed, fluid may flow from the cavity 326 back to the supply passage 314. As a result, the inner piston 330 may remain fully collapsed into the cavity 326 in the outer piston 320 as the outer piston is forced downward by the means for imparting motion 100. In this manner, the variable valve actuator 300 provides valve motion with late opening as illustrated by curve 612 in FIG. 11.

When the switch valve 410 is open, however, as shown in FIG. 10, fluid flow back to the supply passage 314 may be substantially prevented by the check valve 316. When the rocker arm 120 is in contact with the cam 110 base circle, the outer piston 320 attains its upper most position in the outer piston bore 312. At this point, the annular detent 322 in the outer piston registers with the terminus of the supply passage 314 and fluid may enter the cavity 326 in the outer piston through the check valve 316 and the outer piston passages 324. As low pressure fluid enters the cavity 326, the inner piston 330 moves downward relative to the outer piston 320 so that space s is created between the outer piston and the inner piston. The inner piston 330 may move downward until it is prevented from further downward movement by either the retaining ring 332, or the opposing force from springs that bias the valves 200 closed.

As the rocker arm 120 is rotated downward on the outer piston 320 by the one or more lobes on the cam 110, the outer piston slides downward in the outer piston bore 312. The fluid in the cavity 326 cannot escape at this point because the check valve does not permit fluid to flow back towards the low pressure supply. As a result, the inner piston 330 is hydraulically locked relative to the outer piston 320 and the inner piston slides downward with the outer piston and acts on the valve bridge 210 and valves 200.

Figure 11:
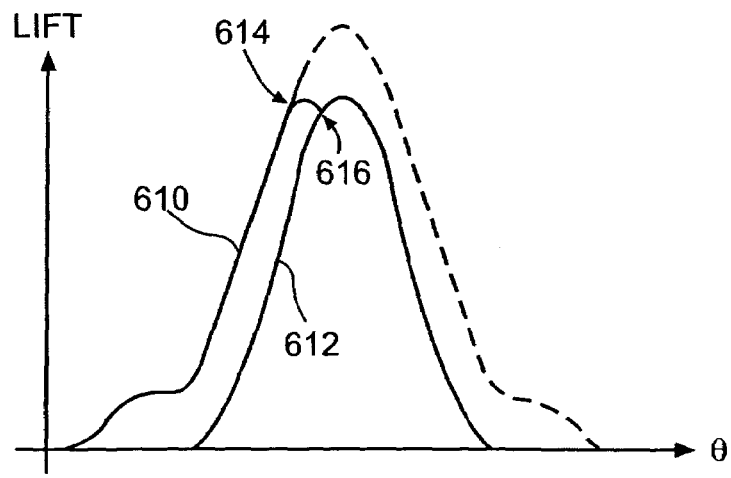
FIG. 11 is a valve lift diagram according to the valve actuation system depicted in FIG. 10.

When the outer piston 320 moves downward sufficiently for the annular detent 322 to register with the reset passage 318, the high pressure fluid in the cavity 326 can vent through the reset passage 318 to the low pressure supply, where it is absorbed. As venting through the reset passage occurs, the inner piston 330 may collapse into the outer piston cavity 326, thereby taking up space s. With reference to FIG. 11, the valve motion provided when the switch valve 410 is closed is illustrated by curve 610, where venting begins at point 614 and is completed at point 616. As is evident from FIG. 11, by selectively opening or closing the switch valve 410, the engine valves 200 may experience earlier valve opening (curve 610) or later valve opening (curve 612).

In one embodiment, the reset passage 318 may communicate with the supply passage 314 at a position before the switch valve 410, providing constant low pressure supply to the outer piston bore 312. In this manner, lubrication may be provided between the inner and outer pistons.

Figure 12:
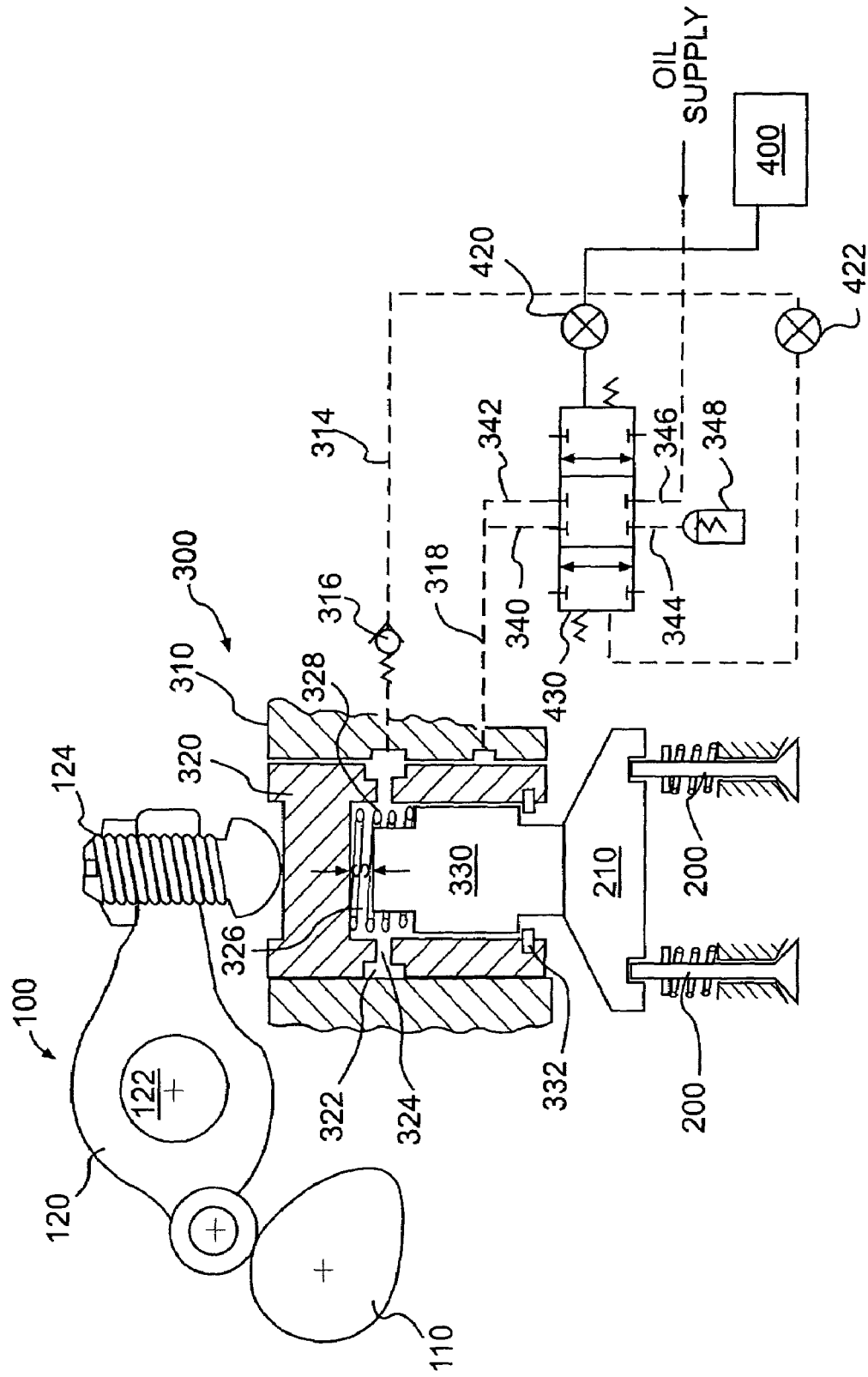
FIG. 12 is a schematic diagram of a valve actuation system according to a fourth embodiment of the present invention.

With reference to FIG. 12, in which like reference characters refer to like elements, the variable valve actuator 300 is slightly different from the system shown in FIG. 8 to provide three levels of selective later or earlier valve closing. The embodiment of the present invention shown in FIG. 12 differs from that shown in FIG. 8 with respect to the portion of the variable valve actuator 300 that is connected to the reset passage 318 and the inclusion of a spring 328 between the inner piston 330 and the outer piston 330.

With continued reference to FIG. 12, the reset passage 318 communicates with dual reset outlets 340 and 342. The dual reset outlets 340 and 342 may communicate with a three-way switch valve 430. The three-way switch valve 430 may provide selective communication between the dual reset outlets 340 and 342 with a corresponding pair of passages denoted as the accumulator passage 344 and the spill passage 346. The accumulator passage 344 may connect the three-way switch valve 430 to an accumulator 348 and the spill passage 346 may connect the three-way switch valve 430 to the low pressure hydraulic fluid supply.

First and second control valves 420 and 422 may be used to selectively bias the three-way switch valve 430 into one of its three possible positions. The three-way switch valve 430 attains a first position when the first control valve 420 and the second control valve 422 are both closed. This first position for the three-way switch valve 430 is shown in FIG. 12. The three-way switch valve 430 attains a second position when the first control valve 420 is open and the second control valve 422 is closed. When the first control valve is open and the second control valve is closed, the three-way switch valve 430 indexes leftward relative to the position shown in FIG. 12. The three-way switch valve 430 may attain a third position when the first control valve 420 is closed and the second control valve 422 is open. When this occurs, the three-way switch valve 430 may index towards the right relative to the position shown in FIG. 11. The opening and closing of the first and second control valves to apply low pressure hydraulic fluid to the three-way switch valve 430 may be carried out pursuant to control signals provided by the controller 400. The three-way switch valve 430 may be biased by one or more springs to attain a default position (e.g., the first position described above) when no hydraulic fluid is applied via the control valves 420 and 422.

Figure 13:
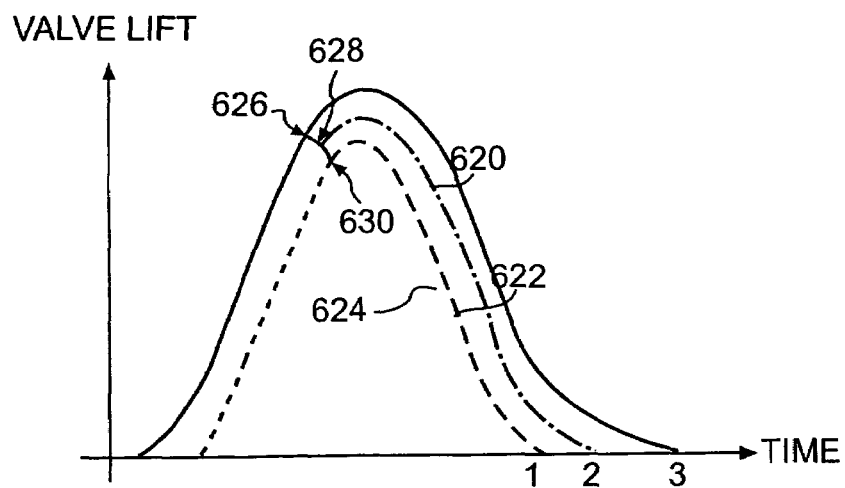
FIG. 13 is a valve lift diagram according to the valve actuation system depicted in FIG. 12.

The embodiment of the present invention shown in FIG. 12 may be operated as follows to provide selective levels of earlier or later valve closing as illustrated in FIG. 13. During engine operation, hydraulic fluid may be supplied to supply passage 314. Fluid flows past the one-way check valve 316 to the terminus of the supply passage 314 at the outer piston bore 312. When the rocker arm 120 is in contact with the cam 110 base circle, the outer piston 320 attains its upper most position in the outer piston bore 312. At this point, the annular detent 322 in the outer piston registers with the terminus of the supply passage 314 and fluid may enter the cavity 326 in the outer piston through the outer piston passages 324. As low pressure fluid enters the cavity 326, the inner piston 330 moves downward relative to the outer piston 320 so that space s is created between the outer piston and the inner piston. The inner piston 330 may move downward until it is prevented from further downward movement by either the retaining ring 332, or the opposing force from springs that bias the valves 200 closed.

As the rocker arm 120 is rotated downward on the outer piston 320 by the one or more lobes on the cam 110, the outer piston slides downward in the outer piston bore 312. The fluid in the cavity 326 cannot escape at this point, however, because the check valve 316 does not permit fluid to flow back towards the low pressure supply. As a result, the inner piston 330 is hydraulically locked relative to the outer piston 320 and the inner piston slides downward with the outer piston and acts on the valve bridge 210 and valves 200.

When the outer piston 320 moves downward sufficiently for the annular detent 322 to register with the reset passage 318, one of three valve motions may be provided depending upon the position of the three-way switch valve 430. If the three-way switch valve 430 is in the first position, as shown in FIG. 12, fluid is blocked from flowing through the three-way switch valve. As a result, fluid cannot flow out of the cavity 326 and the inner piston 330 continues to move downward in unison with the outer piston 320. The valve motion provided when the three-way switch valve 430 is in the first position is illustrated by curve 620 in FIG. 13.

When the three-way switch valve 430 is in the second position, fluid may flow from the first outlet passage 340 through the accumulator passage 344 to the accumulator 348. However, fluid is blocked from flowing from the second outlet passage 342 through the spill passage 346 to the fluid supply. When the three-way switch valve is in the second position and the outer piston 320 moves downward sufficiently for the annular detent 322 to register with the reset passage 318, the high pressure fluid in the cavity 326 can vent through the reset passage 318 and the three-way switch valve 430 to the accumulator 348. Preferably, the accumulator 348 may have a limited stroke. A limited stroke accumulator is capable of absorbing a pre-set amount of hydraulic fluid from the reset passage 318. After the pre-set amount of hydraulic fluid is absorbed by the accumulator 348, further absorption of fluid from the cavity 326 may be blocked. When the accumulator 348 is designed to absorb less than all of the fluid in the outer piston cavity 326, the inner piston 330 may only partially collapse into the outer piston, thereby taking up less than all of space s. With reference to FIG. 13, the valve motion provided when the three-way switch valve 430 is in the second position is illustrated by curve 622, where venting to the accumulator 348 begins at point 626 and is completed at point 628.

When the three-way switch valve 430 is in the third position, fluid may flow from the second outlet passage 342 through the spill passage 344 to the fluid supply. However, fluid is blocked from flowing from the first outlet passage 340 to the accumulator passage 344. When the three-way switch valve is in the third position and the outer piston 320 moves downward sufficiently for the annular detent 322 to register with the reset passage 318, the high pressure fluid in the cavity 326 can vent through the reset passage 318 and the three-way switch valve 430 to the low pressure supply, where it is absorbed. As venting through the reset passage occurs, the inner piston 330 may collapse into the outer piston cavity 326, thereby taking up space s. With reference to FIG. 13, the valve motion provided when the three-way switch valve 430 is in the third position is illustrated by curve 624, where venting begins at point 626 and is completed at point 630. As is evident from FIG. 13, by selectively positioning the three-way switch valve 430, the engine valves 200 may experience one of three levels of earlier or later valve closing (earlier closing—curve 624; intermediate closing—curve 622; and later closing—curve 620).

Figure 14:
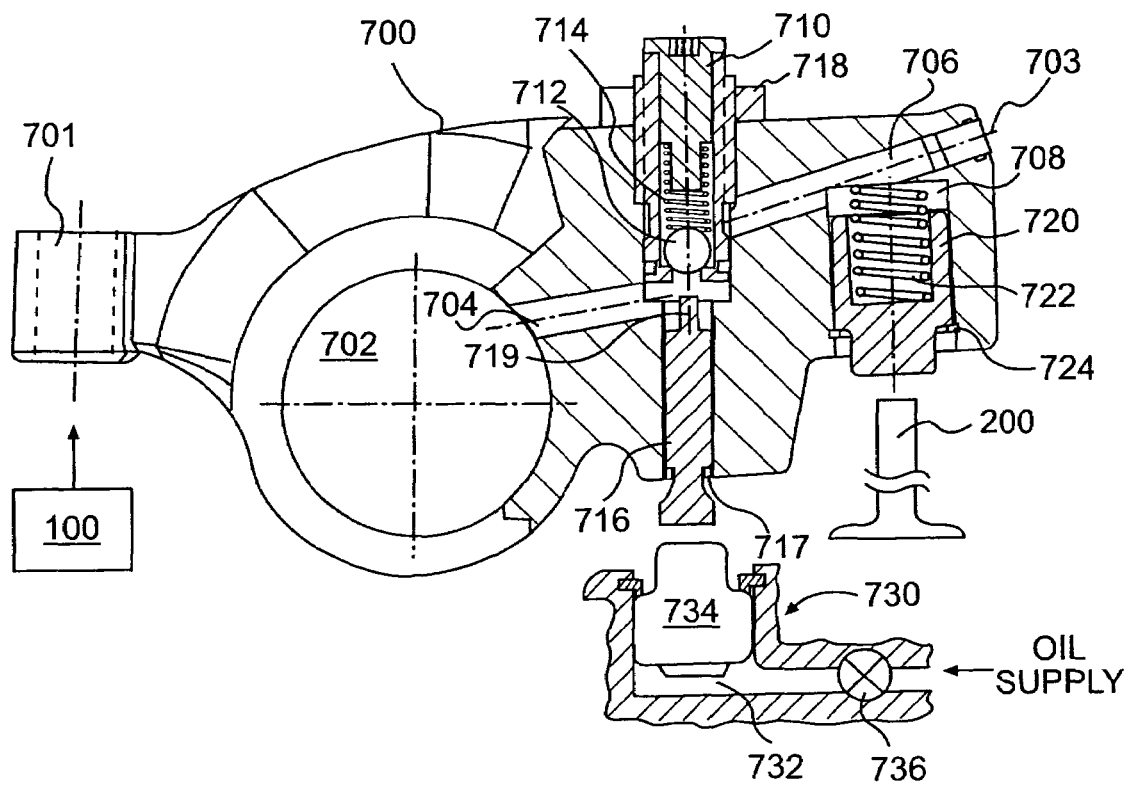
FIG. 14 is a schematic diagram of a valve actuation system according to a fifth embodiment of the present invention.

Another embodiment of the present invention is shown in FIG. 14. With reference to FIG. 14, a cross section of rocker arm assembly 700 is shown. The rocker arm assembly 700 includes a first end 701 adapted to receive a member (not shown) for contacting a motion imparting means 100 such as a cam or push tube (not shown). The motion imparting means 100 may include a cam having any one or more fixed engine braking (compression release or bleeder), main exhaust or intake, brake gas recirculation (BGR), and/or exhaust gas recirculation (EGR) lobes.

A central opening 702, adapted to receive a rocker shaft (not shown), is provided in the rocker arm 700. A first and second fluid supply passages 704 and 706 extend from the central opening 702 to a second end 703 of the rocker arm. The rocker shaft that is inserted into the central opening 702 may itself include hydraulic fluid passages that mate with the first fluid supply passage 704. As a result, hydraulic fluid may flow between the passages in the rocker shaft and the fluid supply passage 704.

A reset passage may extend vertically through the rocker arm 700 at the intersection of the first and second fluid supply passages 704 and 706. A ring-shaped land or shoulder may demark the separation of the reset passage upper portion and the lower portion. A check ball 712 may be disposed in the upper portion of the reset passage. The check ball 712 may be biased downward by a check spring 714. A check valve upper assembly 710 may center the check spring 714 in the reset passage and provide a seat against which the check ball 712 can seat. The check valve upper assembly 710 may be press fit, screwed, or otherwise secured in the upper end of the reset passage so that fluid provided to the reset passage is substantially prevented from escaping from the upper end thereof. A threaded nut 718 may provide for adjustment of the check valve upper assembly 710.

A reset piston 716 is slidably disposed in the lower portion of the reset passage. The reset piston 716 includes a lower end adapted to contact an external stop 734, and an upper end 719 adapted to contact the check ball 712. The lower end of the reset piston 716 may be prevented from excessive downward travel by a retaining ring 717. The lower end of the reset piston 716 may be adapted to provide a seal against the wall of the lower portion of the reset passage. This seal may prevent substantial leakage of fluid out of the lower end of the reset passage.

With continued reference to FIG. 14, the second fluid supply passage 706 may connect the upper portion of the reset passage to a chamber 708 located in the second end 703 of the rocker arm. A cap may be used to seal the end of the second fluid supply passage 706. A piston 720 may be slidably disposed in the chamber 708. The piston 720 may be retained in the chamber 708 by a ring-shaped stop 724. The piston 720 may be adapted to provide a fluidic seal to the wall of the chamber 708 so as to prevent, or at least limit, fluid leakage from the chamber. The piston 720 may be provided with an internal cavity adapted to receive a return spring 722. The return spring 722 may bias the piston 720 toward the stop 724. The lower surface of the piston 720 is adapted to contact an engine valve 200 or a bridge (not shown) for actuating plural engine valve(s).

An external stop 734 may be provided below the rocker arm 700. The external stop 734 may be slidably disposed in a cavity 732. Upward movement of the external stop 734 may be limited by a retaining ring. The external stop 734 may be adjustable in height (e.g., by selectively providing hydraulic fluid to the cavity 732). The control valve 736 may be used to control fluid flow into and out of the cavity 732. The control valve 736 may be connected to the low pressure hydraulic fluid supply (not shown). A controller, discussed earlier and not shown in FIG. 14, may be used to control the timing of opening and closing of the control valve 736.

The operation of the rocker arm assembly 700 to selectively provide earlier valve closing will now be described. Although the following description refers to use of the rocker arm 700 to operate an exhaust valve(s), it is appreciated that this type of rocker arm may be used for both intake, exhaust, and auxiliary valve operation.

During engine operation, low pressure hydraulic fluid enters the rocker arm 700 through the first fluid supply passage 704. Fluid in the first fluid supply passage 704 unseats the check ball 712 and flows into the second fluid supply passage 706 and into the chamber 708. When the cam that actuates the rocker assembly 700 is at base circle, the piston 720 may be pushed downward until it contacts the engine valve 200. As the rocker assembly rotates downward against the engine valve 200 under the influence of the one or more lobes on the cam, fluid pressure in the chamber 708 and the second fluid supply passage increases and forces the check ball 712 to close against its seat. As a result, the piston 720 is hydraulically locked into a downward position relative to the rocker assembly 700.

Figure 15:
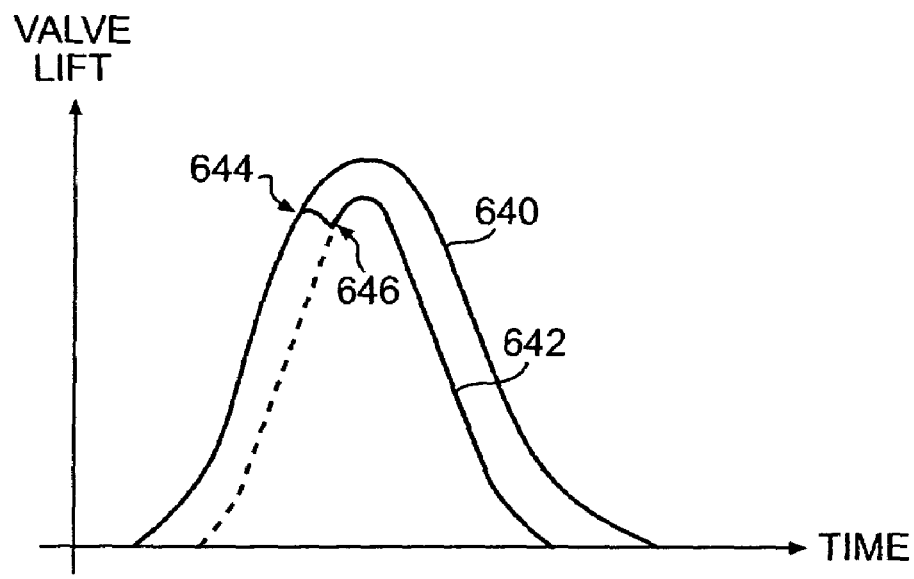
FIG. 15 is a valve lift diagram according to the valve actuation system depicted in FIG. 14.

Release of the hydraulic fluid from the chamber 708 is dependent upon the position of the external stop 734. When the external stop 734 is retracted into the cavity 732, any contact between the reset piston 716 and the external stop that may occur does not cause the reset piston 716 to translate upward enough to open the check ball 712. As a result, the piston 720 remains hydraulically locked into position throughout the rotation of the rocker assembly 700. The valve motion produced as a result is illustrated by curve 640 in FIG. 15.

When the external stop 734 is extended upward as a result of supplying hydraulic fluid to the cavity 732, the downward rotation of the rocker assembly brings the reset piston 716 into contact with the external stop 734. As the rocker assembly 700 moves towards its maximum downward displacement under the influence of the main event lobe on the driving cam, the reset piston 716 contacts the external stop 734 and is pushed upward in the reset passage. As the reset piston 716 moves upward in the reset passage and the upper end 719 of the reset piston may unseat the check ball 712 upward. Unseating the check ball 712 permits the fluid in the chamber 708 to vent back to the low pressure supply in the rocker shaft under the influence of the spring that biases the engine valve closed. The exhaust valve spring(s) exert a greater pressure than that of the hydraulic fluid in the chamber 708. As a result, the downward movement of the rocker arm 700 causes the piston 720 to be forced upward into the chamber 708 until it contacts the upper end of the chamber. After this point, further downward motion of the rocker arm 700 results in the engine valve being opened for a main event. The valve motion produced is illustrated by curve 642 in FIG. 15, where the check ball 712 is unseated at point 644, and the upward movement of the piston 720 relative to the chamber 708 ceases at point 646. As is evident from FIG. 15, by selectively opening or closing the control valve 736, the engine valves 200 may experience earlier valve closing (curve 642) or later valve closing (curve 640).

Figure 16:
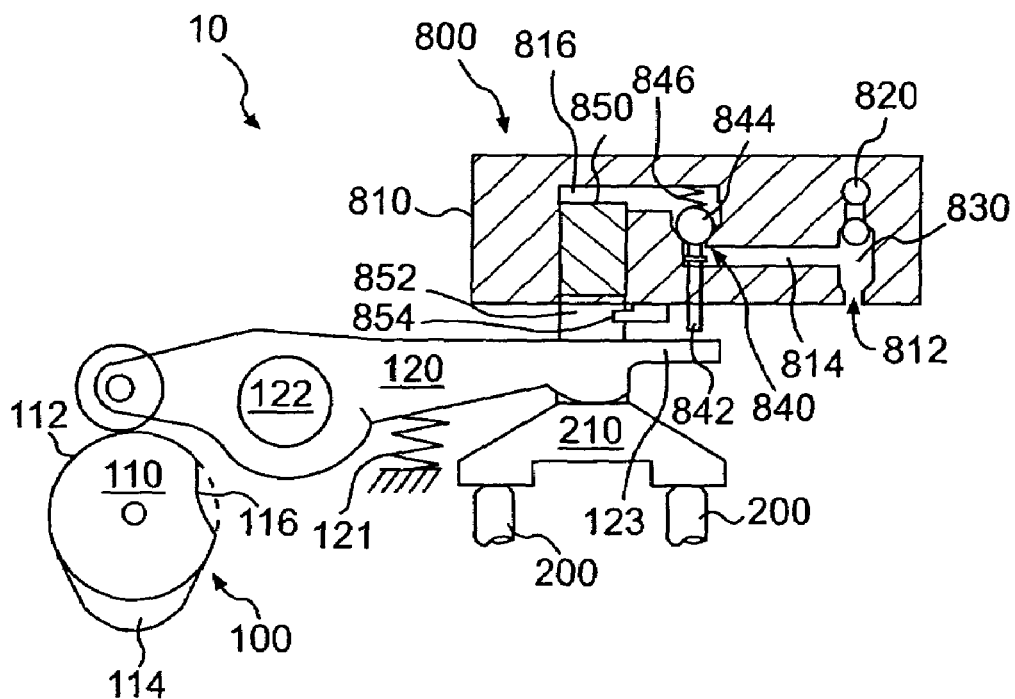
FIG. 16 is a schematic diagram of a valve actuation system according to a sixth embodiment of the present invention.

Another embodiment of the present invention is shown in FIG. 16, in which like reference characters refer to like elements. The valve actuation system 10 may include a rocker arm 120, a means for imparting motion to the rocker arm 100, one or more engine valves 200, and a variable valve actuator 800.

The means for imparting motion 100 may include a cam 110 operatively connected to a first end of the rocker arm 120 either directly or through one or more intermediate valve train elements, such as a push tube (not shown). The cam 110 may have a profile that includes one or more valve actuation lobes 114, base circle portions 112, and a reset profile 116. The shape of the reset profile 116 is exaggerated in FIG. 16 to illustrate the fact that it is ground into the cam profile below base circle. A roller connected to the first end of the rocker arm 120 may act as the contact point between the rocker arm and the means for imparting motion 100.

The rocker arm 120 may be mounted on a rocker shaft 122 so that the rocker arm is able to rock reciprocally about the rocker shaft under the influence of the means for imparting motion 100. A second end of the rocker arm 120 may be adapted to contact an engine valve 200 directly, or more than one engine valve through an intermediate valve bridge 210, as shown. The rocker arm 120 may include an extension 123. A rocker return spring 121 may bias the rocker arm 120 upward toward the variable valve actuator 800. The one or more engine valves 200 may be intake, exhaust, or auxiliary valves that provide selective communication between an engine cylinder and the intake or exhaust manifolds of an engine.

The variable valve actuator 800 may be provided in a fixed housing 810 located above the engine valves 200. The housing 810 may have a low pressure hydraulic fluid supply port 820 that is connected to a hydraulic fluid supply (not shown). A supply valve 830, a reset valve 840, and a hydraulic actuator piston 850 may be contained by the housing 810. A fluid passage 814 may extend through the housing 810 from the supply valve 830 to the reset valve 840, and from the reset valve to a chamber 816 in which the piston 850 is slidably disposed.

The supply valve 830 may be selectively controlled by a controller (not shown). In a first position, the supply valve 830 blocks the flow of hydraulic fluid from the supply port 820 to the passage 814, but enables the flow of hydraulic fluid from the passage 814 to an outlet port 812. In a second position, the supply valve 830 permits the flow of hydraulic fluid from the supply port 820 to the passage 814, but blocks the flow of hydraulic fluid from the passage to the outlet port 812.

The reset valve 840 may include a reset pin 842, a reset ball 844, and an optional reset spring 846. The optional reset spring 846 may bias the reset ball 844 towards its seat in the passage 814. The reset ball 844 and optional reset spring 846 are adapted to permit fluid to flow from the passage 814 into the chamber 816 under the influence of the low pressure supply. The flow of hydraulic fluid to the chamber 816 may force the piston 850 downward toward the engine valves 200. Fluid flow from the chamber 816 back past the reset ball 844 to the passage 814 may be blocked by the reset ball unless and until it is unseated by the reset pin 842. The reset pin 842 may be slidably disposed below the reset ball 844. The reset pin 842 may be adapted to selectively unseat the reset ball 844 when the reset pin is pushed upward against the reset ball.

Figure 17:
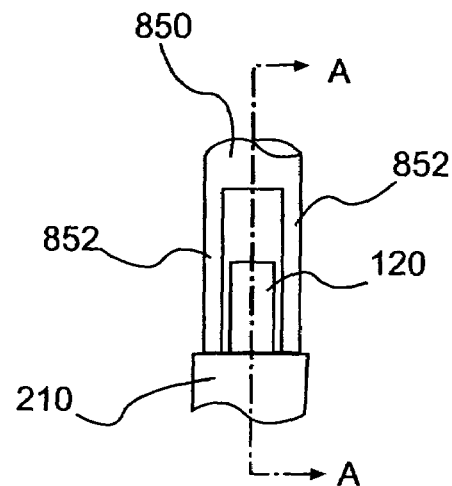
FIG. 17 is a side view of a portion of the valve actuation system depicted in FIG. 16.

The piston 850 may include an upper portion disposed in the chamber 816 and arms 852 extending downward into contact with the engine valves 200 or engine valve bridge 210. An optional piston stop 854 may limit the downward travel of the piston 850 out of the housing 810. The piston arms 852 may straddle the rocker arm 120 in order to contact the valve bridge 210. FIG. 17 illustrates the relationship of the rocker arm 120 to the piston 850 and the piston arms 852. The view of the piston 850, piston arms 852, and rocker arm 120 provided in FIG. 16 corresponds to the view of these elements taken along cut line A-A in FIG. 17.

Figure 18:
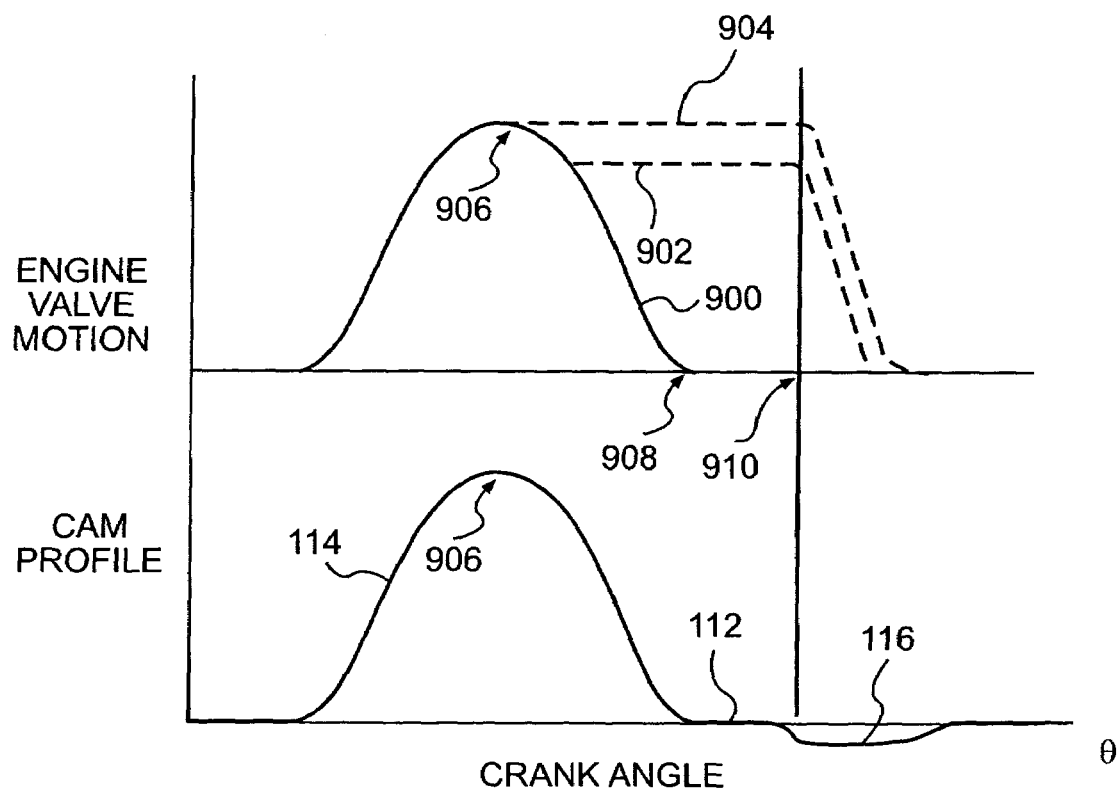
FIG. 18 is a valve lift diagram and cam profile according to the valve actuation system depicted in FIGS. 16 and 17.

With reference to FIG. 18, the valve actuation system 10 shown in FIG. 16 may be used to selectively provide the valve actuations illustrated by curves 900, 902, and 904. During engine operation, valve actuation 900 may be provided when the supply valve 830 is maintained in the first position such that fluid is not provided to the passage 814. When fluid is not provided to passage 814, there is insufficient fluid in the chamber 816 to hold the piston 850 down against the force of the engine valve return springs (not shown) as the rocker arm 120 moves upward. As a result, when fluid is not provided to passage 814, the engine valve motion corresponds to the profile of the one or more valve event lobes 114 on the cam 110. The valve event lobes 114 may be pre-set to provide earlier valve closing.

Relatively later valve closing, as illustrated by valve actuation curve 902, may be provided by opening the supply valve 830 such that fluid is provided to the passage 814 and the chamber 816. The fluid in the chamber 816 causes the piston 850 to extend downward into contact with the valve bridge 210. As the rocker arm 120 rotates downward on the valve bridge 210 under the influence of the lobe 114 on the cam 110, the piston 850 may follow the valve bridge downward while the chamber 816 continues to fill with fluid from the low pressure supply port 820. The piston 850 may follow the downward displacement of the valve bridge 210 until the piston stop 854 prevents further downward travel. After the peak point 906 of the cam lobe 114 passes the contact point with the rocker arm 120, the rocker arm rotates back upward away from the valve bridge 210 as the cam lobe declines towards base circle. In the absence of the variable valve actuator 800, the engine valves 200 would follow the upward motion of the rocker arm 120 to close at point 908.

The presence of the piston 850, however, may modify the upward travel of the valve bridge 210 and engine valves 200. As the valve bridge 210 returns upward with the rocker arm 120, it encounters the piston 850, which in turn forces fluid back towards and closes the reset valve 840. Piston 850 is hydraulically locked into position once the reset valve 840 is closed. Thus, piston 850 holds the valve bridge 210 and engine valves 200 in a fixed position despite the continued upward travel of the rocker arm 120. After the piston 850 becomes hydraulically locked into position, the rocker arm 120 continues to travel upward until it first reaches cam base circle 112 and then the reset profile 116. The rocker spring 121 biases the rocker arm 120 upward into contact with the reset pin 842 when rocker arm 120 encounters the cam reset profile 116. As the rocker arm 120 forces the reset pin 842 upward, the reset pin unseats the reset ball 844 and the fluid in the chamber 816 is able to vent to the low pressure fluid supply. The reset ball 844 is unseated at point 910 in the graph shown in FIG. 18. As the fluid vents from the chamber 816, the piston 850 is forced upward by the force of the return springs acting on the engine valves 200, which in turn allows the engine valves to close. By selectively providing low pressure hydraulic fluid to the chamber 816, the engine valves 200 may experience later valve closing as illustrated by curve 902 in FIG. 18.

Still later valve closing, illustrated by curve 904 in FIG. 18, may be provided by eliminating the optional piston stop 854 shown in FIG. 16. Elimination of the piston stop 854 results in the piston 850 following the valve bridge 210 all the way to the peak point 906 of the cam lobe 114. As the cam rotates away from the peak point 906, the piston 850 is immediately locked into position, and the valve motion illustrated by curve 904 results.

Figure 19:
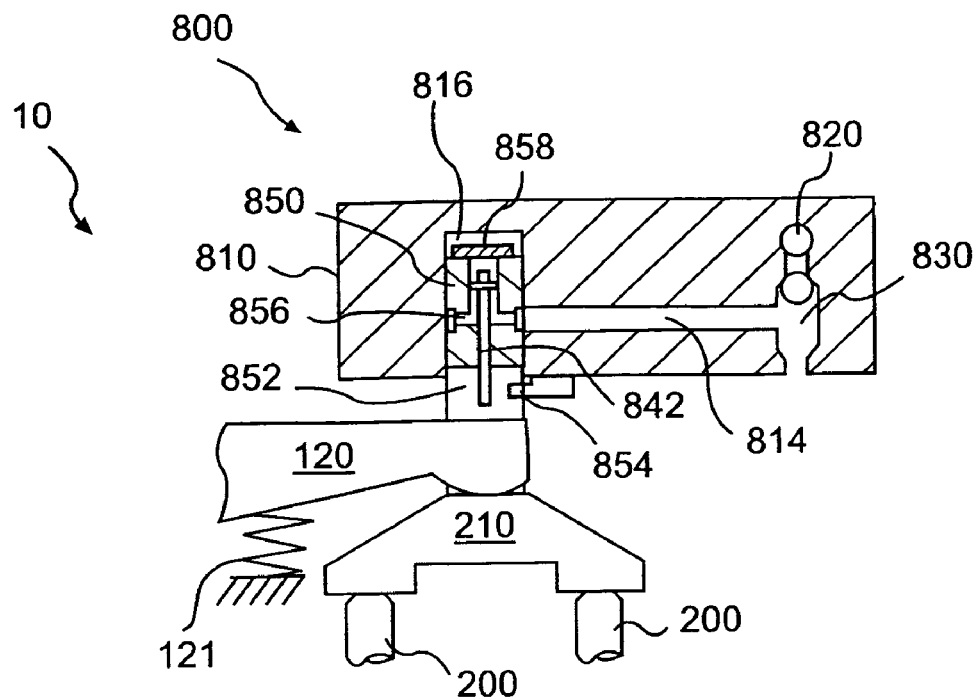
FIG. 19 is a schematic diagram of a valve actuation system according to a seventh embodiment of the present invention.

With reference to FIG. 19, in which like reference characters refer to like elements, the variable valve actuator 800 is modified from the system shown in FIG. 16. In the embodiment of the present invention shown in FIG. 19, the reset valve 840 is incorporated into the piston 850. Internal passages 856 are provided in the piston 850. The internal passages 856 allow hydraulic fluid to flow between the housing passage 814 and the piston chamber 816. The reset piston 842 is slidably disposed in a vertical passage extending through the piston 850. The reset piston 842 includes a lower portion extending out of the piston 850 between the piston arms 852. The reset piston 842 also includes an upper portion adapted to open a reset disk 858. The reset disk 858 is provided in the chamber 816 above the piston 850. An optional spring (not shown) may be used to bias the reset disk towards the piston 850.

The embodiment of the present invention shown in FIG. 19 operates functionally in the same general manner as the embodiment of the invention shown in FIG. 16. When hydraulic fluid is not supplied to the passage 814 and the chamber 816, valve motion 900 is produced (as shown in FIG. 18). Relatively later valve closing, as illustrated by valve actuation curves 902 and 904, may be provided by opening the supply valve 830 such that fluid is provided to the passage 814, the internal passages 856, and the chamber 816. The fluid in the chamber 816 causes the piston 850 to extend downward into contact with the valve bridge 210. As the rocker arm 120 rotates downward on the valve bridge 210 under the influence of the lobe 114 on the cam 110, the piston 850 may follow the valve bridge downward while the chamber 816 continues to fill with fluid from the low pressure supply port 820. After the peak point 906 on the cam profile, the valve bridge 210 returns upward with the rocker arm 120 and encounters the piston 850, which in turn forces fluid back towards and closes the reset disk 858. Piston 850 is hydraulically locked into position once the reset disk 858 is closed. Thus, piston 850 holds the valve bridge 210 and engine valves 200 in a fixed position despite the continued upward travel of the rocker arm 120. After the piston 850 becomes hydraulically locked into position, the rocker arm 120 continues to travel upward until it first reaches cam base circle 112 and then the reset profile 116. The rocker spring 121 biases the rocker arm 120 upward into contact with the reset pin 842 when rocker arm 120 encounters the cam reset profile 116. As the rocker arm 120 forces the reset pin 842 upward, the reset pin unseats the reset disk 858 and the fluid in the chamber 816 is able to vent to the low pressure fluid supply. The reset disk 858 is unseated at point 910 in the graph shown in FIG. 18. As the fluid vents from the chamber 816, the piston 850 is forced upward by the force of the return springs acting on the engine valves 200, which in turn allows the engine valves to close.

Figure 20:
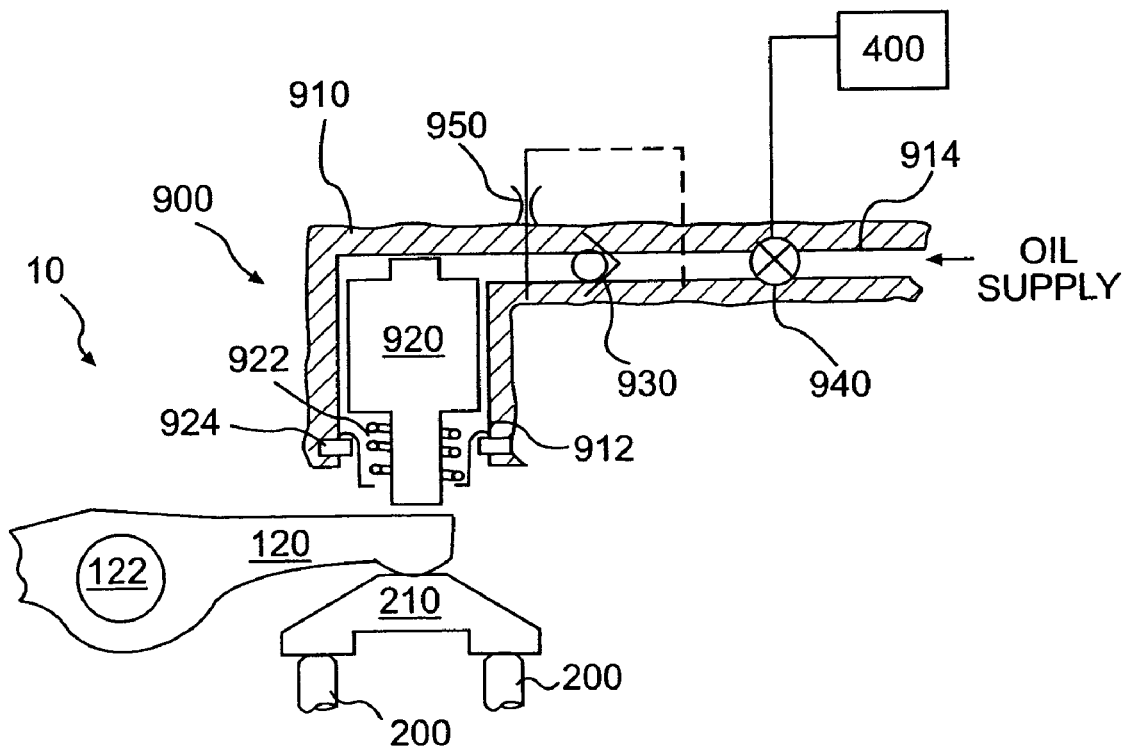
FIG. 20 is a schematic diagram of a valve actuation system according to a eighth embodiment of the present invention.

Another embodiment of the present invention is shown in FIG. 20, in which like reference characters refer to like elements. The valve actuation system 10 may include a rocker arm 120, a means for imparting motion to the rocker arm (not shown), one or more engine valves 200, and a valve actuator 900 for providing variable valve actuation for internal exhaust gas recirculation.

The valve actuator 900 may be provided in a fixed housing 910 having a piston bore 912 formed therein. A hydraulic fluid supply passage 914 may extend through the housing 910 and terminate at the upper end of the piston bore 912. A check valve 930 may be disposed in the supply passage 914 so as to primarily allow only one-way fluid flow from the fluid supply passage 914 to the piston bore 912. A control valve 940, such as, for example, a low-speed solenoid valve, may be connected to the supply passage 914 so as to control the flow of fluid through the passage. The controller 400 may direct the control valve 940 to supply fluid to the supply passage 914 as needed. A bleeding orifice 950 may be provided to allow high-pressure fluid to bleed out of supply passage 914 between the piston bore 912 and the check valve 930.

An EGR piston 920 is slidably disposed in the piston bore 912. A spring 922 operatively connected to the piston 920 biases the piston 920 away from the rocker arm 120. A retaining ring 924 may limit the downward extension of the piston 920 to a predetermined distance.

The embodiment of the present invention shown in FIG. 20 may be operated as follows to provide selective variable lift for an exhaust gas recirculation valve event. When EGR is required, the control valve 940 is activated, and oil is permitted to flow through the control valve 940 and the check valve 930 to the piston bore 912. The resulting oil pressure pushes the piston 920 out against the rocker arm 120. As the rocker arm rotates, actuating the valves 200, the piston 920 follows the valve motion and continues moving down until the piston 920 hits the retaining ring 924.

Figure 22:
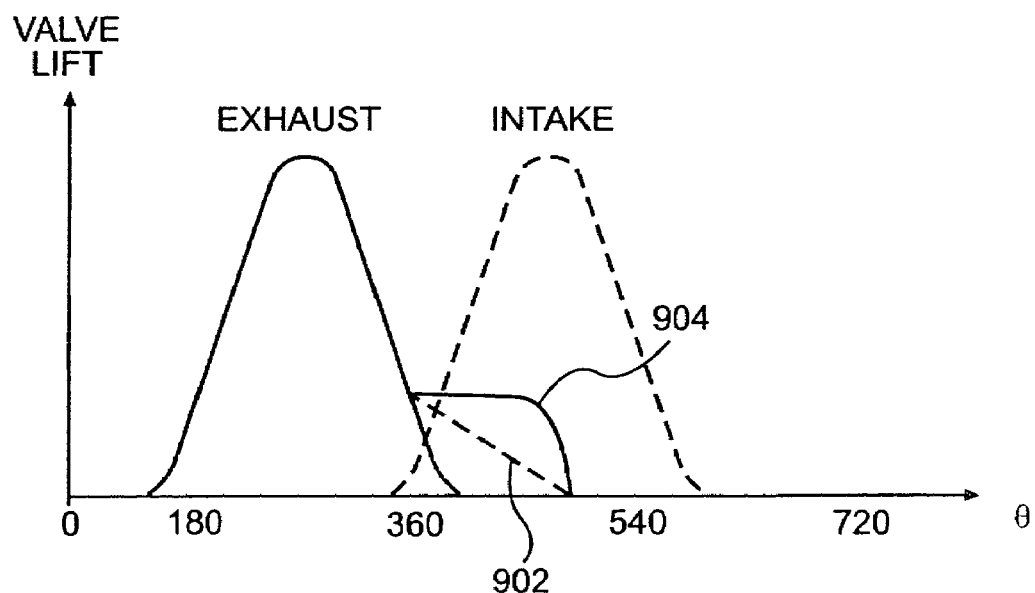
FIG. 22 is a valve lift diagram according to the valve actuation systems depicted in FIGS. 20 and 21.

As the rocker arm begins to return, the oil pressure above the piston is sufficient to hold open the engine valves 200 and produce an exhaust gas recirculation event. The fluid above the piston, however, is permitted to slowly vent through the bleeding orifice 950. With reference to FIG. 22, the valve motion provided as the high-pressure fluid vents through the bleeding orifice 950 is illustrated by curve 902.

Figure 21:
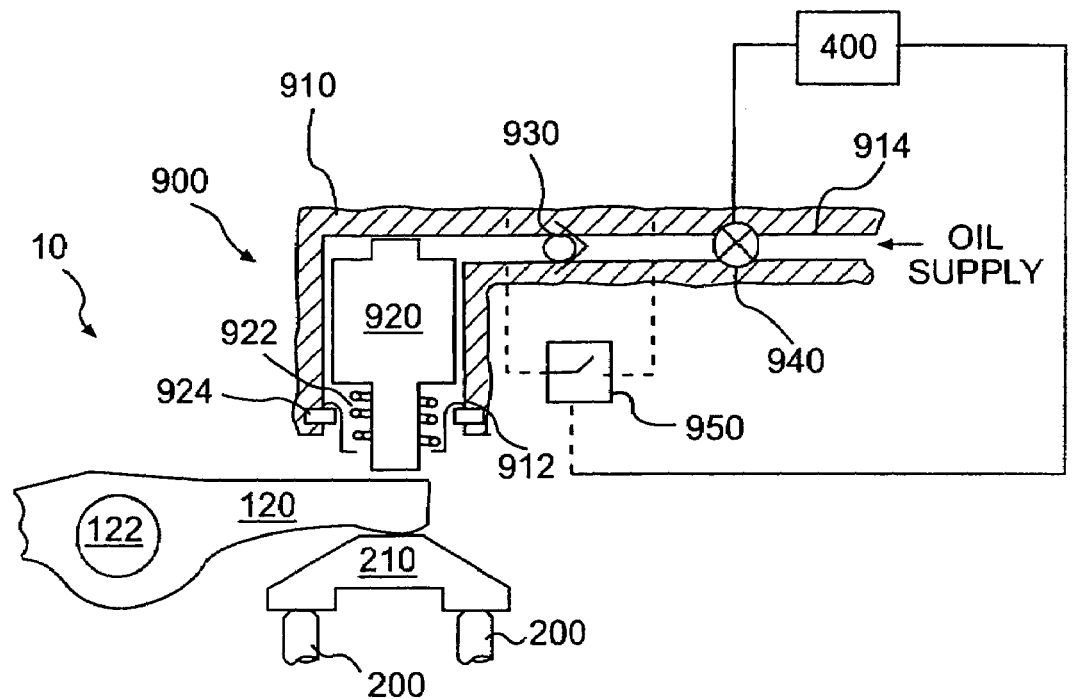
FIG. 21 is a schematic diagram of a valve actuation system according to a ninth embodiment of the present invention.

With reference to FIG. 21, in which like reference characters refer to like elements, the valve actuator 900 differs slightly from the system shown in FIG. 20 to provide a slightly different exhaust gas recirculation valve lift. The valve actuator 900 includes a switch valve 950 connected to the supply passage 914 instead of the bleeding orifice 950. During exhaust gas recirculation operation, the piston 920 holds open the valves 200 until the switch valve 950 is activated. At this point, the fluid in the supply passage between the piston bore 912 and the check valve 930 may be released through the switch valve 950. With reference to FIG. 22, the valve motion provided as the fluid vents through the switch valve 950 is illustrated by curve 904.

It will be apparent to those skilled in the art that variations and modifications of the present invention can be made without departing from the scope or spirit of the invention. Thus, it is intended that the present invention cover all such modifications and variations of the invention, provided they come within the scope of the appended claims and their equivalents.

What is claimed is:

1. A system for actuating an engine valve in an internal combustion engine to produce an engine valve event, said system comprising:
    means for imparting valve actuation motion;
    a housing disposed intermediate said motion imparting means and the engine valve;
    a bore extending through said housing in an axial direction;
    an outer piston slidably disposed in the bore formed in said housing, said outer piston having a cavity formed therein and an internal passage extending from the cavity to an outer surface of the outer piston;
    an inner piston slidably disposed in the outer piston cavity;
    a first hydraulic passage extending through a check valve and the housing to a first port on said bore;
    a second hydraulic passage extending through the housing to a second port on said bore, wherein the second hydraulic passage is axially spaced from the first hydraulic passage along said bore, and wherein the outer piston internal passage registers with only one of the first port and the second port at any one time; and
    a valve in communication with the outer piston cavity through the internal passage and the second hydraulic passage, said valve having more than one position, wherein the position of said valve determines the timing of the engine valve event, and
    wherein the first passage is a supply passage adapted to supply hydraulic fluid to the outer piston cavity, and the second passage is a reset passage adapted to release hydraulic fluid from the outer piston cavity.

2. The system of claim 1, wherein the position of said valve determines the engine valve opening timing.

3. The system of claim 1, wherein the position of said valve determines the engine valve closing timing.

4. The system of claim 1, further comprising a controller operatively connected to said valve.

5. The system of claim 1, wherein said supply passage is operatively connected to said reset passage.

6. The system of claim 1, wherein said valve comprises a two-way switch valve.

7. The system of claim 1, wherein said valve comprises a three way switch valve.

8. The system of claim 1, wherein the engine valve event comprises an engine valve event selected from the group consisting of: a main intake valve event, a main exhaust valve event, a compression release braking valve event, a bleeder braking valve event, and an exhaust gas recirculation valve event.

9. A system for actuating an engine valve in an internal combustion engine to produce an engine valve event, said system comprising:
    means for imparting valve actuation motion;
    a housing disposed intermediate said motion imparting means and the engine valve;
    a bore extending through said housing in an axial direction from a point distal from the engine valve to a point proximal to the engine valve;
    an outer piston slidably disposed in the bore formed in said housing, said outer piston having a cavity formed therein and an internal passage extending from said cavity to an outer surface of the outer piston;
    an inner piston slidably disposed in the outer piston cavity;
    a supply passage extending through said housing to the bore at a first point along the axis of the bore, said supply passage being adapted to supply hydraulic fluid to the outer piston cavity;
    a reset passage extending through said housing to the bore at a second point along the axis of the bore, said second point being closer to the engine valve than the first point, and said reset passage being adapted to release hydraulic fluid from the outer piston cavity; and
    a three-way valve for selectively blocking said reset passage, said three-way valve being disposed along and in hydraulic communication with said reset passage, said three-way valve having a first position and a second position, wherein the position of said three-way valve determines the timing of the engine valve event, wherein said three-way valve selectively blocks the reset passage, connects the reset passage with a limited stroke accumulator, or connects the reset passage with a hydraulic fluid supply.

10. The system of claim 9, wherein the position of said hydraulic fluid control valve determines the engine valve closing timing.

11. The system of claim 9, wherein the position of said hydraulic fluid control valve determines the engine valve opening timing.

12. The system of claim 9, further comprising first and second hydraulic valves adapted to selectively vary the three-way valve between three positions.

* * * * *